United States Patent [19]

Guironnet et al.

[11] Patent Number: 5,120,492
[45] Date of Patent: Jun. 9, 1992

[54] DEVICE FOR EXTRACTING A BLOCKING SLEEVE FROM A REMOVABLE GUIDE TUBE OF A FUEL ASSEMBLY OF A NUCLEAR REACTOR

[75] Inventors: Louis Guironnet, Lyon; Michel Bline, L'Arbresle, both of France

[73] Assignees: Framatome, Courbevoie; Cogema, Villacoublay, both of France

[21] Appl. No.: 409,200

[22] Filed: Sep. 19, 1989

[30] Foreign Application Priority Data

Sep. 19, 1988 [FR] France .................. 88 12207

[51] Int. Cl.⁵ .......................................... G21C 19/32
[52] U.S. Cl. ............................... 376/261; 294/94; 29/255
[58] Field of Search ............... 376/261, 260, 446; 976/DIG. 68, DIG. 264, DIG. 65; 269/48.1; 294/93, 86.24, 906, 94, 96; 29/723, 906, 426.5, 234, 235, 255, 259, 262, 450, 451, 900

[56] References Cited

U.S. PATENT DOCUMENTS

| | | | |
|---|---|---|---|
| 2,641,831 | 6/1953 | Helton | 29/426.5 |
| 4,638,543 | 1/1987 | Shallenberger et al. | 376/261 |
| 4,639,998 | 2/1987 | Shallenberger et al. | 376/261 |
| 4,664,874 | 5/1987 | Shallenberger et al. | 376/261 |

FOREIGN PATENT DOCUMENTS

| | | |
|---|---|---|
| 0182149 | 5/1986 | European Pat. Off. |
| 0189797 | 8/1986 | European Pat. Off. |
| 0223342 | 5/1987 | European Pat. Off. |

Primary Examiner—Daniel D. Wasil
Attorney, Agent, or Firm—Pollock, Vande Sande & Priddy

[57] ABSTRACT

The device comprises a pole fastened to a handling and lifting apparatus arranged above the pool in which the fuel assembly is placed under water. The pole has at least one lower end part (32), the diameter of which is less than the inside diameter of the blocking sleeve (25). This part (32) is pierced with a central bore (40) and with at least two radial orifices (56), in each of which is located a retention claw (57). A rod (41) sliding in the axial bore (40) makes it possible to control the extraction of the claws. The vertical movement of the pole makes it possible to extract the blocking sleeve (25).

8 Claims, 13 Drawing Sheets

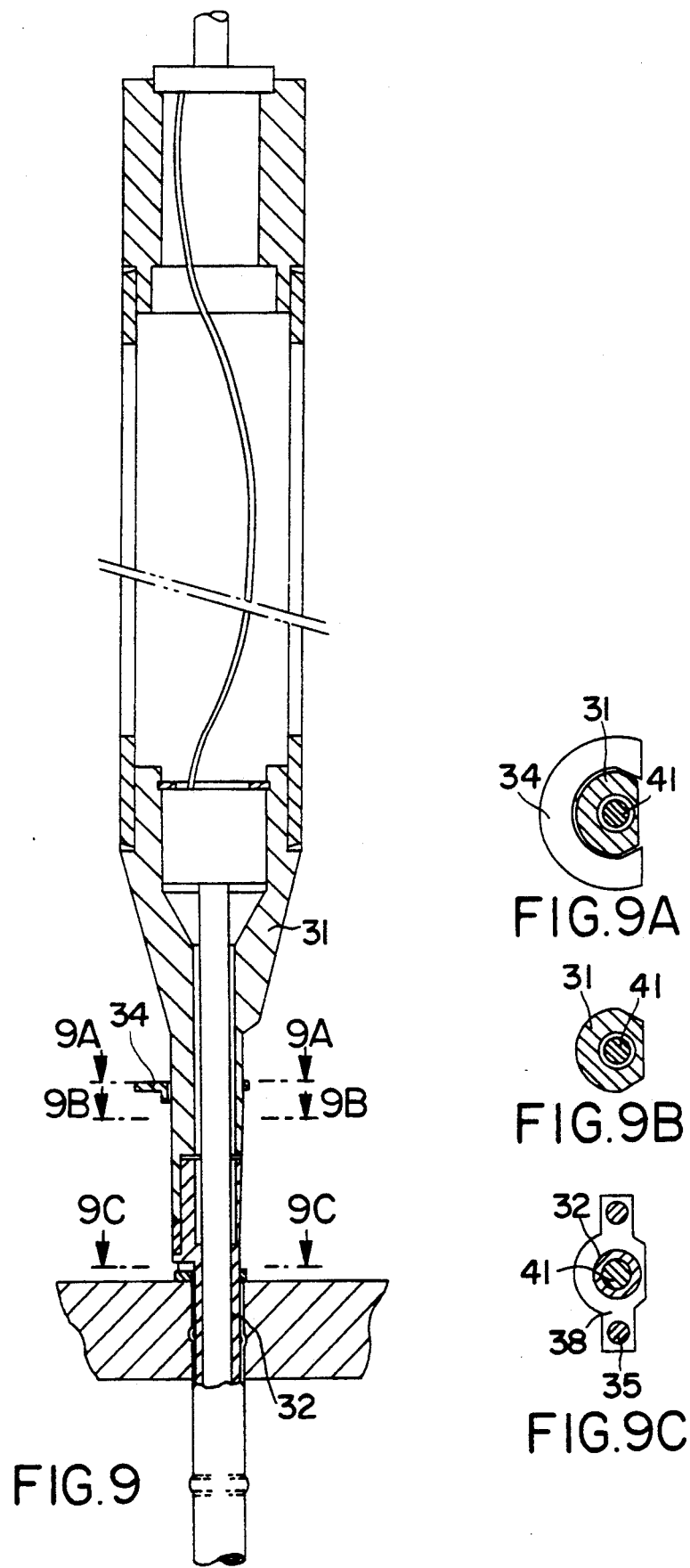

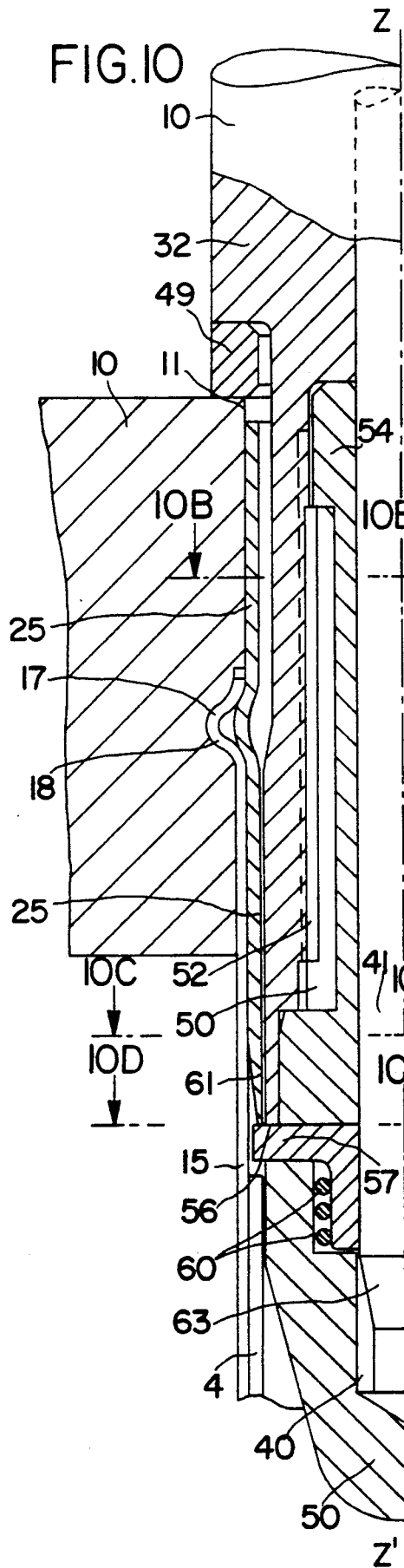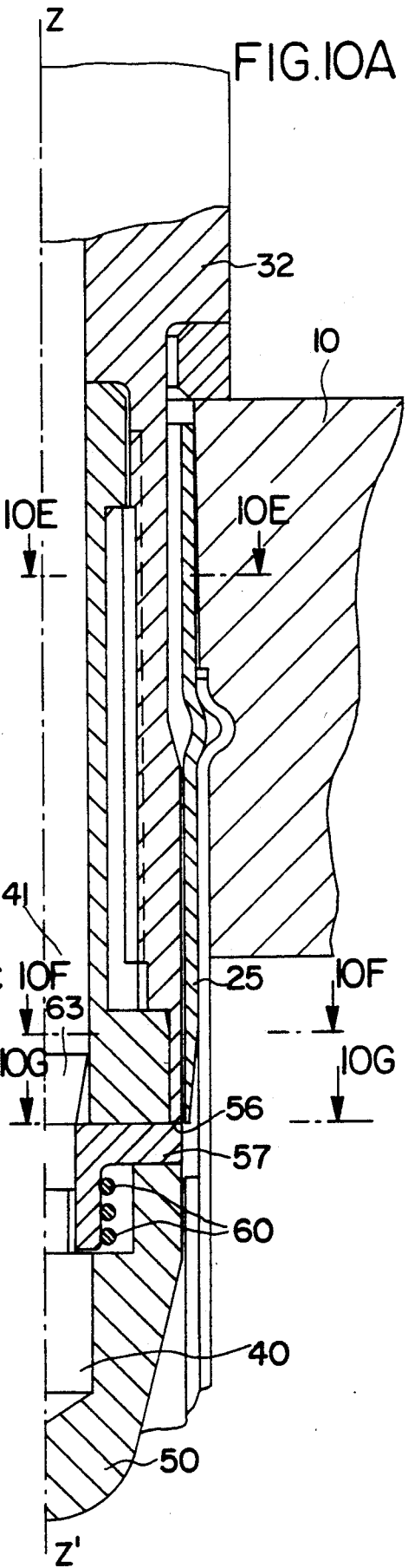

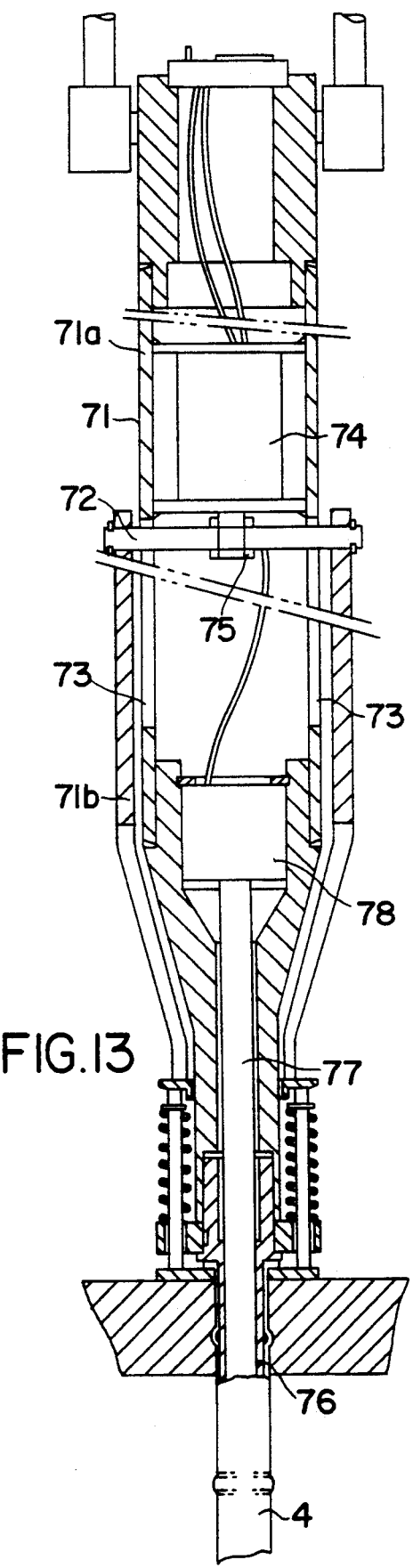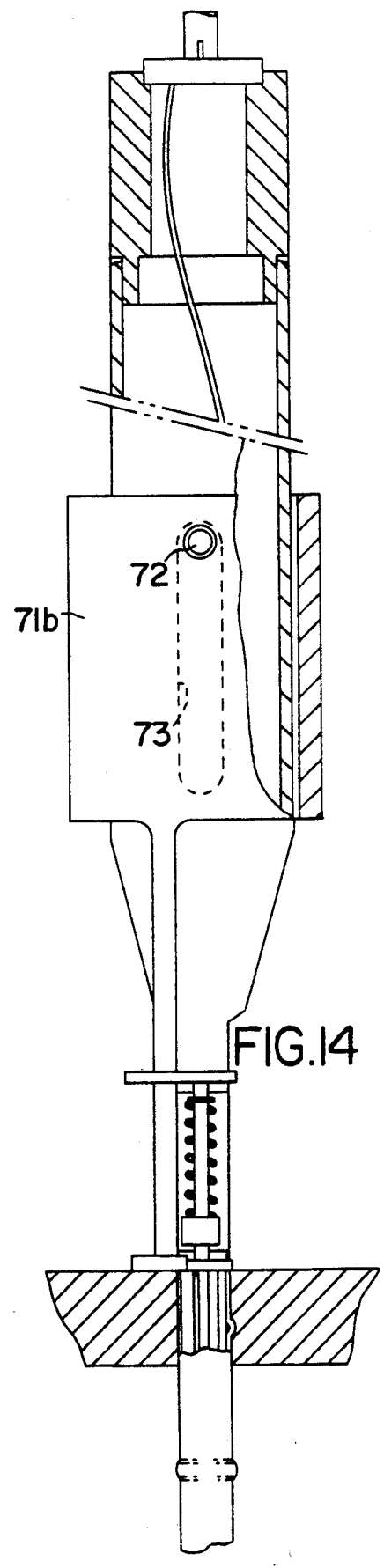

DEVICE FOR EXTRACTING A BLOCKING SLEEVE FROM A REMOVABLE GUIDE TUBE OF A FUEL ASSEMBLY OF A NUCLEAR REACTOR

FIELD OF THE INVENTION

The invention relates to a device for extracting a blocking sleeve from a removable guide tube of a fuel assembly of a nuclear reactor cooled by pressurized water.

BACKGROUND OF THE INVENTION

Water-cooled nuclear reactors, especially pressurized-water nuclear reactors, have fuel assemblies consisting of a bundle of fuel rods of great length arranged parallel to one another and held in a framework formed by guide tubes, spacers and two end connectors. The guide tubes are arranged in the longitudinal direction of the assembly and are connected to transverse spacers uniformly spaced over the length of the assembly.

The guide tubes are likewise connected, at each of their ends, to one or the other of two connectors forming pieces for stiffening and closing the assembly.

The fuel rods of the assembly form a bundle, in which the rods are parallel to one another and, in the cross-sections of the assembly, are arranged according to a regular network determined by the spacers. Some positions of the network are occupied by guide tubes which are generally connected rigidly to the spacers.

The guide tubes are longer than the fuel rods and are arranged in the bundle so as to have a part projecting relative to the bundle of fuel rods at each of their ends. The connectors are fastened to these projecting parts of the guide tubes, in order to ensure that the assembly is closed at each of its ends.

The fuel rods consist of sintered pellets of nuclear fuel material which are stacked inside a metal sheath isolating the pellets from the fluid surrounding the fuel assembly. If the sheath of a rod of a fuel assembly breaks, it is necessary to replace this rod very quickly in order to prevent any radioactive product from leaking into the cooling fluid of the reactor. To gain access to the fuel rods and carry out their replacement, one of the connectors of the assembly has to be removed, and this requires breaking the connections between the corresponding ends of the guide tubes and the connector.

The connectors have passage holes which reproduce the network of guide tubes and in each of which a guide tube is engaged and fastened.

In the most customary technique, the guide tubes are fastened permanently to the connectors, usually by welding, and it is impossible to carry out the removal of the connector in order to replace a rod. If a sheath on a rod breaks, therefore, the defective fuel assembly has to be replaced by a new fuel assembly. The defective fuel assembly is dismantled and the non-defective, but highly irradiated fuel rods contained in this assembly are recovered and reinstalled in a new fuel-assembly framework. To carry out these operations and manipulations of contaminated elements, it is necessary to take precautions and work in complex and costly installations. The recovery of the non-spent fuel rods in the defective assemblies is therefore an operation involving a very high outlay.

New fuel assemblies having guide tubes, of which the connection to at least one of the end connectors is removable, have therefore been designed and developed.

The assembly is placed under water in the vertical position, in a pool, such as a fuel-assembly storage pool, in which the replacement of the defective fuel rods is carried out. The guide tubes of the assembly are in vertical position, the assembly resting on the bottom of the pool by means of the lower connector. The upper connector is accessible, under a certain depth of water, from the top of the pool. Those parts of the guide tubes engaged in the upper connector of the assembly have a radially expandable part which, for example, can be attached to the end of the guide tube. This radially expandable part consists of a split bush with a radially projecting part which is intended to come to rest in a cavity of corresponding form machined inside the connector, in the passage hole of the guide tube. A blocking sleeve introduced inside the guide tube ensures the radial expansion of the split bush and the retention of the guide tube.

The removal of the upper connector of the assembly makes it necessary to remove the connection of each of the guide tubes, and this can be carried out by extracting the blocking sleeve, accessible from inside, from the top of the upper connector.

There are therefore devices making it possible to carry out the extraction of a blocking sleeve from a guide tube in an upper connector of a fuel assembly placed in vertical position in a pool. There are also devices for putting a blocking sleeve in place in a guide tube during the reinstallation of the upper connector of the assembly.

In particular, there is a known device for extracting the blocking sleeves from the guide tubes of a removable fuel assembly, which comprises a tubular element having slots and being radially expandable by means of a rod equipped with an end knob and mounted movably inside the tubular element. The tubular element has an annular rim projecting radially outwards. The tool incorporating the expandable tubular element is mounted on a centering plate which is placed on the upper connector of the assembly, thus making it possible to introduce the tubular element into a guide tube equipped internally with a blocking sleeve. An adjustable stop makes it possible to adjust the length of the tubular element introduced into the tube, in such a way that the projecting rim assumes a position just below the blocking sleeve. The movement of the rod makes it possible to expand the tubular element and bring the rim to bear on the lower part of the blocking sleeve.

The blocking sleeve is released and extracted by subjecting the upper part of the tool to repeated shocks.

This device is difficult to put into practice, because it requires the fitting of a centering plate and then an adjustment of the stop for adjusting the depth of insertion, and these operations have to be conducted under water inside a pool. In particular, it is difficult to ensure that the projecting rim of the expandable element is positioned very precisely under the blocking sleeve.

Moreover, since extraction is carried out by means of shocks, the successive jolts experienced by the tube and the upper connector of the assembly can cause some damage. At all events, the extraction operation is relatively lengthy, inasmuch as, for each assembly, twenty four blocking sleeves, each arranged in one of the twenty four guide tubes, have to be withdrawn in succession before the removal of the upper connector is carried out.

Also known are other devices which are based on the same principle and in which the extraction is carried out as a result of the movement of a plate to which the expandable tubular element of the tool is fastened by means of a screw/nut device. The tool comprises a second plate coming to bear on the upper connector of the assembly, with the result that the reaction of the extraction forces on the bosses of the upper connector risks causing deformations which make it necessary to replace it in order to conduct a correct reinstallation of the fuel assembly.

Moreover, in all these devices, the extracted sleeve remains engaged on the extraction spindle, and it is therefore impossible to re-use the tool without separating the sleeve from the spindle. To conduct this operation of separating the sleeve, the tool has to be raised to the level of the service platform of the pool. This results in losses of time caused by the movements of the tool in order to raise it and lower it in the pool.

SUMMARY OF THE INVENTION

The object of the invention is, therefore, to provide a device for extracting a blocking sleeve from a guide tube in a removable connector of a fuel assembly of a nuclear reactor, the assembly, consisting of a bundle of parallel fuel rods held in a framework formed by guide tubes, spacers and two end connectors, being placed under water in a pool, the guide tubes in the vertical position being connected removably to the end connector located at the upper level of the assembly by means of a radially deformable guide-tube end part which is seated in a hole passing through the upper connector and which has a radially projecting retention part and receives a blocking sleeve in its inner part in order to ensure the radial expansion and retention of the guide tube by means of its retention part in an annular widening of the hole of the connector, this extraction device being simple to put into practice without the risk of damage to the fuel assembly.

To this end, the device according to the invention comprises:

a pole which is fastened in the vertical position to a handling and lifting means arranged above the pool and which has at least one lower end part, the diameter of which is less than the inside diameter of the blocking sleeve and which is pierced with an axially directed central bore and with at least two radial orifices communicating with the central bore and opening onto the outer surface of the pole, a rod mounted slideably in the bore and having an upper part connected to a means of axial movement carried by the pole and a lower part of a diameter reduced relative to its running part, and at least two retention claws, each mounted in a radial orifice radially movably between a retracted position, in which the outer end of the claw in the radial direction is contained within the inner perimeter of the blocking sleeve, and an extracted position, in which the claw projects relative to the inner perimeter of the blocking sleeve, by means of the rod moving in such a way as to bring either its running part or its part of reduced diameter into coincidence with the claws, and by an elastic return means, a shim for adjusting the spacing between the pole and the upper connector, in order to adjust the axial position of the pole relative to the guide tube in which extraction is being carried out, and, means for the vertical movement of the pole.

BRIEF DESCRIPTION OF THE DRAWINGS

In order that the invention may be more clearly understood, several embodiments of an extraction device according to the invention, used for the removal of upper connectors of fuel assemblies of a pressurized-water nuclear reactor, will now be described by way of example, with reference to the accompanying drawings.

FIG. 9 is a view in axial section of an extraction device according to the invention in a second embodiment.

FIGS. 9A, 9B and 9C are sectional views of FIG. 9 along lines 9A—9A, 9B—9B and 9C—9C, respectively.

FIGS. 10 and 10A are large-scale half-views in axial section of the lower part of the extraction device shown in FIG. 8.

FIG. 13 is a sectional front elevation view of a second alternative embodiment of an extraction device according to the invention.

FIG. 14 is a profile elevation view, partially in section, of the device illustrated in FIG. 13.

DETAILED DESCRIPTION

Figure 1:
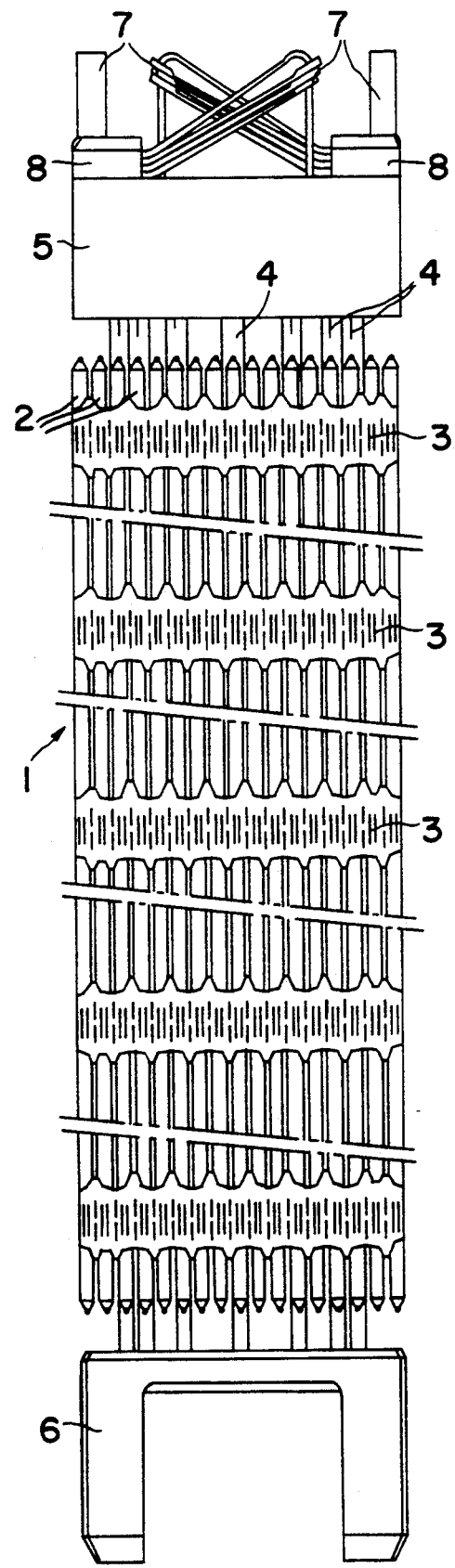
FIG. 1 is an elevation view of a fuel assembly of a pressurized-water nuclear reactor.

FIG. 1 shows a fuel assembly 1 and consisting of a bundle of parallel fuel rods 2 held by means of spacers 3 arranged at a certain spacing over the length of the rods 2. The spacers 3 consist of grids, the cells of which each receive a fuel rod. Some positions of the network of the grids are occupied by guide tubes 4, which are longer than the fuel rods 2.

The guide tubes 4 are connected, at one of their ends to a connector 5 forming the upper connector of the fuel assembly and, at their other end, to a second connector 6 forming the lower connector.

The assembly, in its operating position or its storage position, is arranged vertically, as shown in FIG. 1.

When the assembly is in a storage position under water in a pool, the upper connector 5 is accessible from the top of the pool. This upper connector 5 carries leaf springs 7 ensuring that the assembly is held in the core of the reactor, the upper core plate of which comes to rest on the springs 7. The connector also comprises studs 8 projecting from to its upper face.

Figure 2:
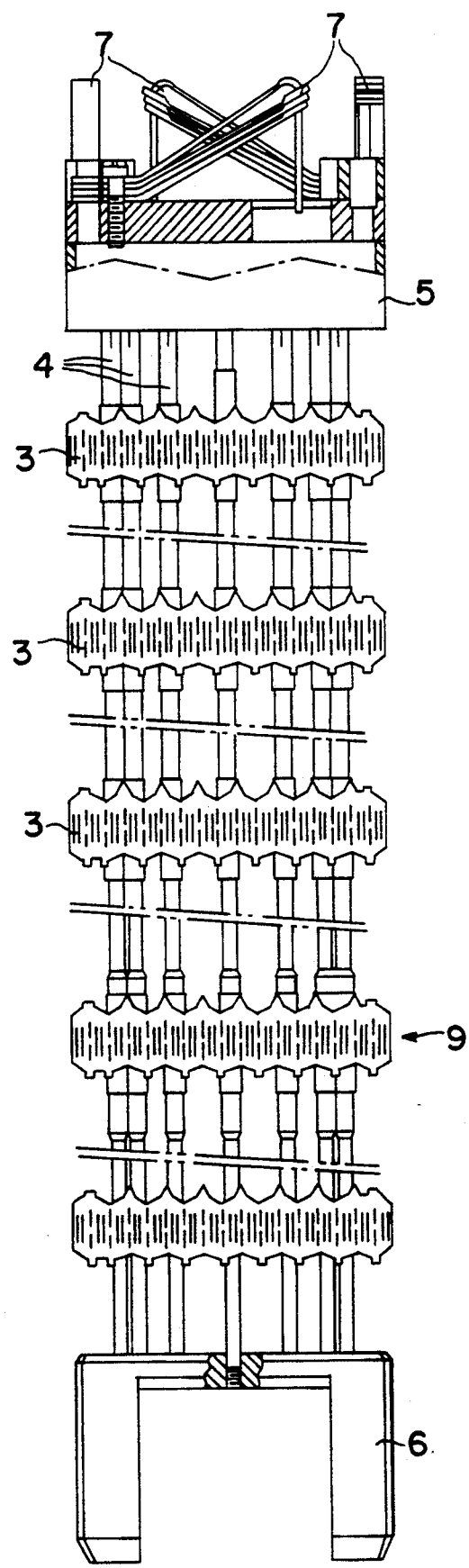
FIG. 2 is an elevation view of the framework of the assembly shown in FIG. 1.

FIG. 2 shows the framework 9 of the fuel assembly, comprising the guide tubes 4, spacers 3 and the end connectors 5 and 6. This framework 9 serves as a receptacle for the fuel rods 2 of the bundle which can be introduced into or extracted from the framework when the upper connector 5 is removed. To carry out the replacement or extraction of rods, removable connections are provided between the end of the guide tubes 4 and the upper connector 5.

Figure 3:
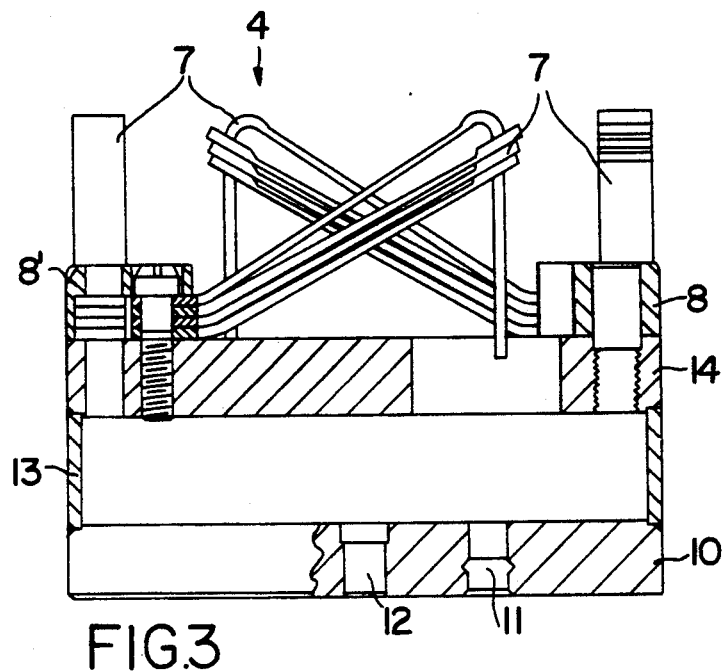
FIG. 3 is an elevation view, partially in section, of the upper connector of the fuel assembly.
Figure 4:
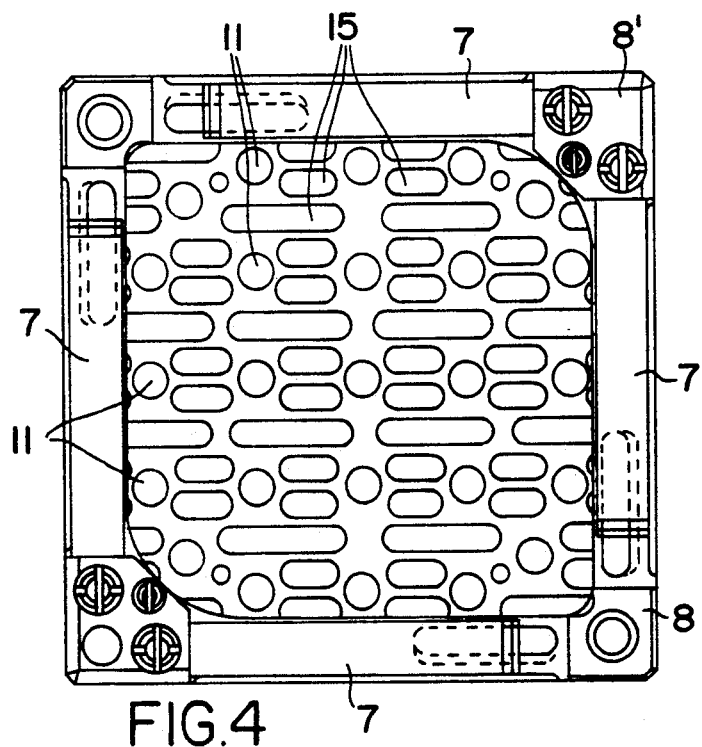
FIG. 4 is a top plan view, in the direction of arrow 4, of the upper connector shown in FIG. 3.

FIGS. 3 and 4 show an upper connector of a fuel assembly, comprising an adaptor plate 10 into which the guide tubes engage, inside orifices 11 passing through this adaptor plate and accessible from the upper part of the fuel assembly. The centrally arranged instrumentation guide tube of the fuel assembly is received in an orifice 12 of special form. The upper connector of the assembly consists of the adaptor plate 10 and of a frame 14 which are connected to one another by means of a skirt 13 welded to the plate 10 and to the frame 14. The frame 14 carries the bosses 8 comprising the centering orifices and the flanges 8' for hold the springs 7.

As can be seen in FIG. 4, the passage holes 11 allowing the guide tubes 4 to be fastened are arranged in specific positions corresponding to the positions of the twenty-four guide tubes of the assembly. Water passage holes 15 extend through the adaptor plate 10 of the connector between the passage orifices 11 for the guide tubes.

Figure 5:
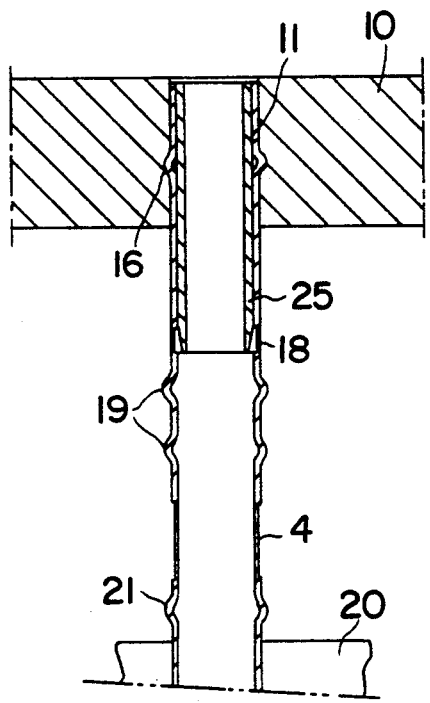
FIG. 5 is a view in axial section of the elements for fastening a guide tube in the upper connector of the assembly.

As can be seen in FIG. 5, the passage orifices 11 of the adaptor plate 10 receiving the guide tubes 4 have an annular widening 16, in which a wheel projection 17 located at the upper end of the guide tube 4 comes to rest.

Figure 6:
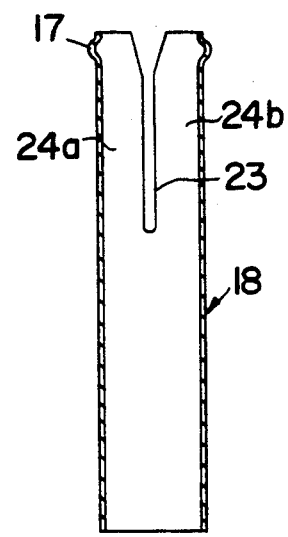
FIG. 6 is an elevation view of the end part of the guide tube ensuring its retention in the upper connector.

In the embodiment illustrated in FIGS. 5 and 6, the upper part 18 of the guide tube 4 consist of a sleeve attached to the upper end of this guide tube and fastened by means of deformed annular zones 19 of the sleeve 18 and of the guide tube 4.

A sleeve 21 passing through the upper spacer grid 20 is likewise fastened to the guide tube as a result of annular deformation of the lateral wall of the guide tube and of the sleeve.

The sleeve 18 has two diametrically opposite slots 23 delimiting two cylindrical sectors 24a and 24b in the wall of the sleeve 18. The two cylindrical sectors 24a and 24b, which have the annular projection 17 in the vicinity of their ends, allow some diametral expansion or some diametral contraction of the end of the sleeve 18.

For installation of the guide tube, the sleeve 18 is introduced into a passage orifice 11 of the adaptor plate 10, in such a way as to bring the annular projections 17 into coincidence with the widened part 16 of the orifice. This introduction can be carried out easily as a result of the diametral contraction of the elastic cylindrical sectors 24a and 24b.

Figure 7A:
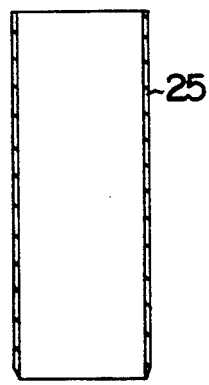
FIG. 7A is a sectional view of a blocking sleeve according to a first embodiment.
Figure 7B:
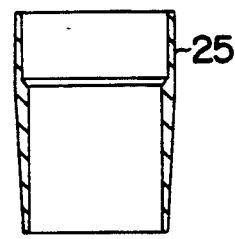
FIG. 7B is a sectional view of a blocking sleeve according to a second embodiment.

The guide tube is blocked in position by introducing a blocking sleeve 25 into the sleeve 18 via the upper face of the adaptor plate 10. The blocking sleeve 25 may, for example, be cylindrical, as shown in FIG. 7A, or slightly frustoconical, as shown in FIG. 7B.

Figure 7D:
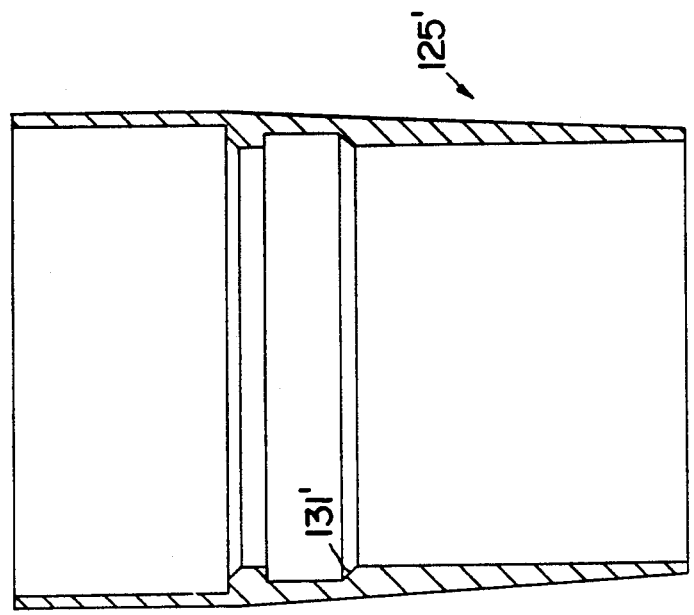
FIG. 7D is a sectional view of a blocking according to an alternative version of the third embodiment.
Figure 7C:
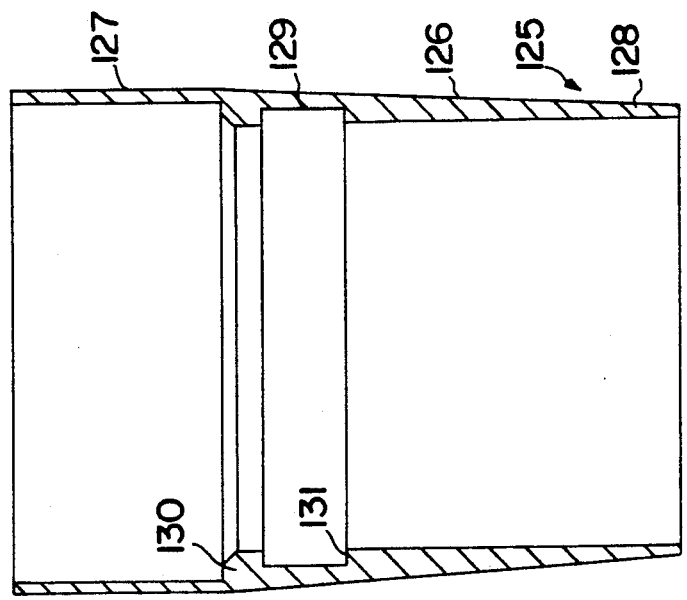
FIG. 7C is a sectional view of a blocking sleeve according to a third embodiment.

FIGS. 7C and 7D illustrate a blocking sleeve 125 of cylindrical frustoconical outer form, which makes it possible to block a guide tube in position reliably by means of simple operations. As discussed hereinbelow, the invention is likewise put practice advantageously when a blocking sleeve 125, such as that shown in FIG. 7C or FIG. 7D, is used.

The blocking sleeve 125 comprises a one-piece tubular wall 126, the outer surface of which has a cylindrical upper part and a frustoconical lower part which are connected by means of the large base of the frustoconical part.

The thickness of the wall 126 is variable over the height of this wall. The upper part 127 of the wall forms a collar of small thickness. The inner bore of the lower part 128 of the blocking sleeve is cylindrical, with the result that the wall has a thickness decreasing from the top downwards in this lower part 128.

The part 128 of the wall has an annular groove 129 in the vicinity of its upper end, in its part of large thickness.

The collar 127 is separated from the frustoconical part 128 by a rim 130 projecting radially towards the inside of the sleeve. The groove 129 is delimited on the opposite side to the rim 130, i.e., downwards, by a shoulder 131.

The groove 129 can be used to put the blocking sleeve 125 in place in a guide tube by introducing a gripping tool into the groove 129, as will be explained later. An axial push can be exerted on the sleeve 125 by means of the shoulder 131, in order to obtain the blocking of the guide tube which is kept apart by means of the frustoconical part 128 engaged in the guide tube.

The collar 127 is then located in a part of the bore of the connector of the assembly which is not occupied by the guide tube. One or more radial indentations are machined in this part of the bore of the connector. After the blocking of the guide tube, the collar 127 is pushed into the radial indentations of the bore of the connector, and it ensures that the blocking sleeve is fastened in these.

FIG. 7D shows an alternative embodiment of the blocking sleeve of FIG. 7C. The sleeve 125' is identical to the sleeve 125, except for the fact that it has a frustoconical shoulder 131' instead of the plane shoulder 131 used during the installation of the blocking sleeve in the guide tube.

At all events, the connection between the guide tube 4 and the adaptor plate 10 can be removed by extracting the blocking sleeve 25 in such a way as to allow diametral contraction of the sleeve 18 forming the upper part of the guide tube inside the adaptor plate.

This operation of extracting the blocking sleeves from the guide tubes of an assembly can be carried out under water in a pool where the assembly is stored.

Figure 8:
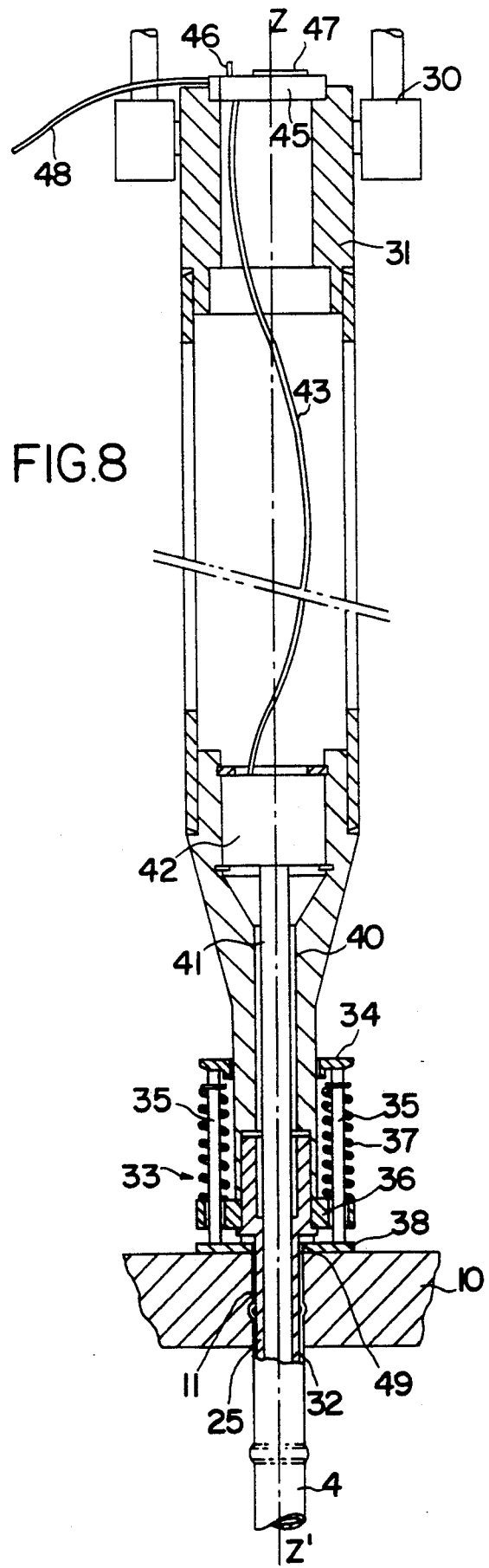
FIG. 8 is a view in axial section of a second embodiment of an extraction device according to the invention.

According to the invention, a device, such as that shown in FIG. 8, is suspended by means of a grab handle 30 on a handling and lifting means arranged above the pool.

The device mainly comprises a tubular pole 31, the length of which can be of the order of four meters. The pole 31 has a lower part consisting of an attached tubular piece 32 which will be described in more detail with reference to FIGS. 10 and 10A. This lower part 32, called a spindle, has an outside diameter slightly less than the inside diameter of the blocking sleeve 25 of the tube 4, in the adaptor plate 10 of the upper connector of the assembly, during removal.

A unit 33 for ejecting the blocking sleeves is arranged around the end part of the pole 31 to which the spindle is fastened. This unit 33 comprises an upper plate 34 mounted slideably on the end of the pole 31 and forming an ejecting pusher, to which is fastened a set of stems 35 which are mounted slideably in a guide piece 36 fixed to the part 32 of the pole and which are returned to the high position by means of springs 37 bearing on the plate 36.

That end of the stems 35 which is opposite the plate 34 is fastened to an ejector plate 38 mounted slideably on the outer surface of the spindle 32 of the pole. The downward actuation of the pusher 34 makes it possible to eject a blocking sleeve which has just been extracted from a guide tube and which has remained strung on the spindle 32 of the pole/ after the latter has been lifted.

The pole 31 has, inside its lower part 32 and in the extension of the latter, and axially directed central bore 40 in which a rod 41 is mounted slideably. The upper part of the rod 41 is fixed to the rod of a jack 42 fed with fluid under pressure via a pipeline 43 connected, in the upper part of the pole, to a control housing 45, on which is mounted a key 46 making it possible to control the jack 42. A level gauge 47 is fastened to the upper part of the pole on the control housing, in order to adjust the verticality of the axis ZZ' of the pole.

The extraction device is fed via a flexible hose 48 connected to an energy source available in the reactor building, if the device is used for replacing fuel rods in assemblies arranged in the pool of the reactor.

To put the device according to the invention into practice, it is placed in vertical alignment with a passage orifice of the adaptor plate 10, in which a guide tube 4 is fastened by means of a blocking sleeve 25. The lower part 32 of the pole is introduced into the orifice 11 until the ejector plate 38 contacts with the upper face of the adaptor plate 10. A shim 49 inserted between the spindle 32 of the pole and the ejector plate 38 makes it possible accurately to adjust the depth of insertion of the tool into the guide tube and the positioning of the extraction tool in relation to the blocking sleeve 25.

FIGS. 10 and 10A illustrate, on a larger scale, the spindle 32 in the extraction position inside a guide tube 4 and a blocking sleeve 25 according to FIG. 7A. However, the ejection unit 33 has been omitted for the sake of greater clarity, and the depth-adjusting shim 49 has been shown fastened to the upper part of the adaptor plate 10.

In FIG. 10A, the extraction device has been shown in its retracted position allowing it to pass inside the blocking sleeve 25. In contrast, in FIG. 10, the device has been shown in its position allowing the blocking sleeve 25 to be extracted.

The upper end part of the guide tube 4 consisting of the expandable sleeve 18 having the annular projection 17 is held in position in the adaptor plate 10 by the blocking sleeve 25 engaged into the end of the guide tube and into the orifice 11 of the adaptor plate.

The sleeve 25 is blocked axially inside the upper part of the guide tube as a result of a radial expansion of annular form occurring in the region of the annular projection 17 of the guide tube seated in the annular widening of the passage hole 11.

As can be seen in FIGS. 10, 10A and 10B to 10G, the lower part 32 of the pole consists of a connector 50 comprising a frustoconical end part which terminates in a spherical surface and which is screwed inside a bore 52 formed axially in the spindle 32, there being interposed a spacer 54 having a central bore forming part of the bore 40 of the pole in which the rod 41 slides.

Figure 10B:
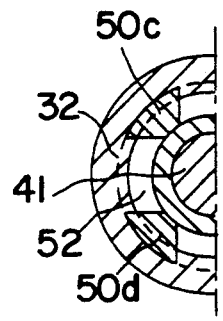
FIGS. 10B, 10C, 10D, 10E, 10F and 10G are sectional half-views along line 10B—10B, 10C—10C, 10D—10D, 10E—10E, 10F—10F and 10G—10G, respectively of FIG. 10 or 10A.
Figure 10E:
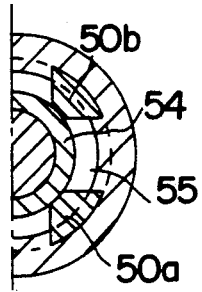

As can be seen in FIGS. 10B and 10E, the threaded part of the piece 50 comprises four parts 50a, 50b, 50c, 50d, between which axial apertures 55 are formed.

Figure 10C:
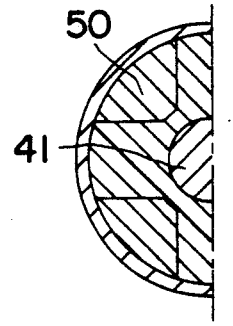
Figure 10F:
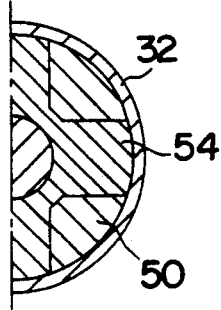

In FIGS. 10C and 10F, it can be seen that the lower part of the spacer 54 has a cross-shaped cross-section, in the angles of which are received four parts of the piece 50 which are extended upwards by the four threaded sectors 50a, 50b, 50c, 50d. Between the lower part of the spacer 54 and the end part of the piece 50 are formed four radial orifices 56, in each of which is seated a claw 57.

The four claws 57 are returned towards the axis ZZ' of the pole by return springs 60. The four claws 57 capable of moving in the radial orifices 56 between a retracted position, shown in FIG. 10A, and an extracted position, shown in FIG. 10.

In the retracted position of the claws 57, the radially and outwardly arranged end of these claws is within the inner perimeter of the blocking sleeve 25.

On the contrary, in the extracted position of the claws, the outer end of these claws in the radial direction is outside the inner perimeter of the sleeve 25. On the other hand, the adjustment of the shim 49 is such that the claws 57 slide exactly under the lower end 61 of the blocking sleeve 25.

Where a blocking sleeve 125 or 125', such as that shown in FIG. 7C and 7D, is concerned, the design of the spindle 32 of the tool and the adjustment of the shim 49 are such that the claws 57 assume a position level with the groove 129 of the blocking sleeve.

It will also be seen that the lower part of the piece 50 is the centered by the guide tube itself, the inside diameter of which is very slightly larger than the diameter of the cylindrical part of the piece 50 located just above the frustoconical engagement part.

Figure 10D:
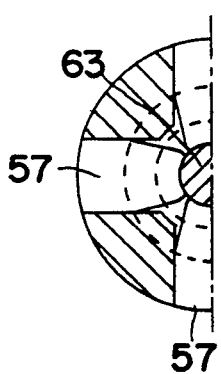
Figure 10G:
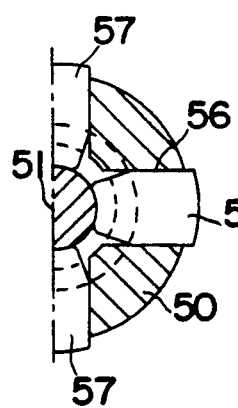

The claws 57 have been shown in the extracted position in FIG. 10G and in the retracted position in FIG. 10D. It can also be seen in these FIGS. 10D and 10G that the radial orifices 56 are each delimited between two adjacent parts of the piece 50.

The rod 41, in its lower part, has a part 63 of a diameter reduced in relation to the running part of the rod 41.

When the running part of the rod is in contact with the inner surface of the claws 57, these claws are pushed outwards into the extracted position counter to the springs 60. On the contrary, when the part 63 of reduced diameter is brought into coincidence with the inner surface of the claws 57, the springs 60 cause the claws to retract into the position shown in FIG. 10A. In this position of the claws, the lower part of the pole can be introduced into the blocking sleeve 55 and, by means of the shim 49, placed in the position shown in FIGS. 10 and 10A. The rod 41 is then moved downwards by feeding the jack 42, thereby causing the extraction of the claws 57.

The blocking sleeve 25 can be extracted by keeping the rod 41 in its low position by maintaining the pressure in the jack 42 and exerting a pull vertically upwards on the pole, for example by means of the winch of a travelling crane arranged above the pool of the reactor, its hook being connected to the grab handle 30 of the pole. The weight of the fuel assembly is sufficient to ensure that it is kept at the bottom of the pool during the extraction.

The extraction of the blocking sleeve 25 is thus carried out without bearing on the fuel assembly and by exerting an axially directed force on the lower part of the blocking sleeve 25. As regards the sleeve 125 or 125', such as that shown in FIGS. 7C and 7D, the axial force of the tool is exerted on the sleeve by means of the groove 129 and makes it possible to deform the collar 127 so as to extract its deformed parts from the radial indentations of the bore of the connector.

FIG. 9 and FIGS. 9A, 9B and 9C illustrate a second embodiment of an extraction device according to the invention, designed for extracting blocking sleeves from the peripheral guide tubes of the assembly in the vicinity of the frame 14 and the skirt 13 of the upper connector.

The general form of the device is the same as that of the device shown in FIG. 8.

Shown particularly is the form given to the ejecting pusher 34, to the ejector plate 38 and to the lower end part of the pole 31, to make it possible to place these elements in the immediate vicinity of one of the walls of the connector.

Figure 11:
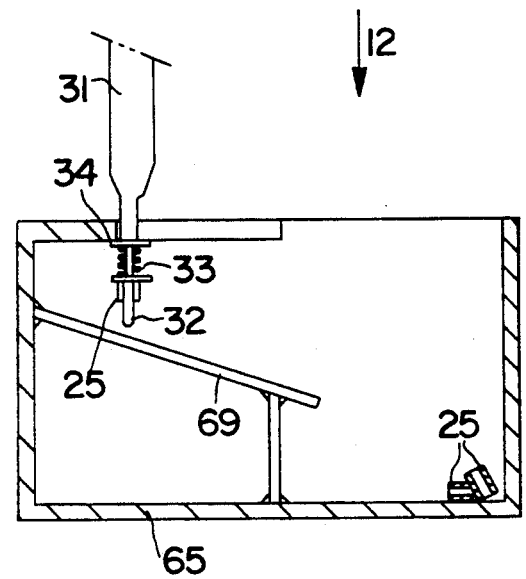
FIG. 11 is a schematic sectional elevation view of the extraction device according to the invention during the ejection of a sleeve just extracted into a storage bin.
Figure 12:
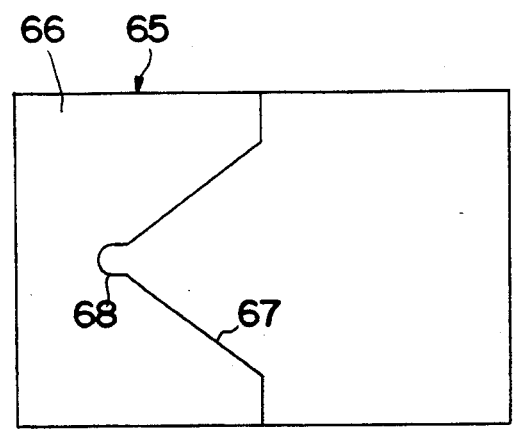
FIG. 12 is a top view, in the direction of arrow 12, of the storage bin shown in FIG. 11.

FIGS. 11 and 12 show a bin 65 for recovering the blocking sleeves 25 extracted from guide tubes by means of the device according to the invention. The recovery bin 65 comprises an upper wall 66 having a V-shaped cutout 67 terminating in a cavity 68 intended for receiving the end of the pole 31 which, by means of the handling device of the reactor, is brought vertically in line with the recovery bin 65 located in the immediate vicinity of the upper connector which is being removed. The lower part 32 of the pole 31 made it possible to extract a blocking sleeve 25 in the way described above. This blocking sleeve 25, which underwent a slight contraction during the extraction, is crimped onto the end part 32 of the pole 31 and cannot be separated simply by falling down under the effect of gravity when the claws 57 are returned to their retracted position.

With the pole 31 in its position shown in FIG. 12, the ejecting pusher 34 is in contact with the lower surface of the wall 66, and as a result of a slight upward movement of the pole 31, the pusher 34 is actuated and the sleeve 25 ejected by the ejection unit 33 descried above. The sleeve 25 then falls onto the inclined plane 69 which ensures that the sleeve is guided towards the bottom of the recovery bin 65.

The inclined plane 69 also serves as a locating means when the pole 31 is being put in place within the cutout 67 of the wall 66.

FIGS. 13 and 14 illustrate a third embodiment of an extraction device according to the invention, in which the pole 71 comprises two parts 71a and 71b mounted telescopically relative to one another by means of an axle 72 fixed to the upper end of the lower part 71b of the pole and mounted inside two guide apertures 73 passing through the wall of the upper part 71a of the pole. A jack 74 is fastened to the part 71a and has a rod connected by means of a fork 75 to the axle 72 fixed to the part 71b.

A jack 78, the rod of which is fixed to the actuating rod 77 of the claws of the device, makes it possible to carry out the extraction of these claws in a position under the blocking sleeve or in the groove 129.

Feeding the jack 74 so as to cause its rod to descend brings about, by reaction, the lifting of the part 71a of the pole and therefore of the spindle 76 carrying the claws and engaged inside the guide tube 4, the part 71b bearing on the connector by means of the ejection unit 33. This causes the extraction of the blocking sleeve, without using the crane of the reactor.

Figure 15:
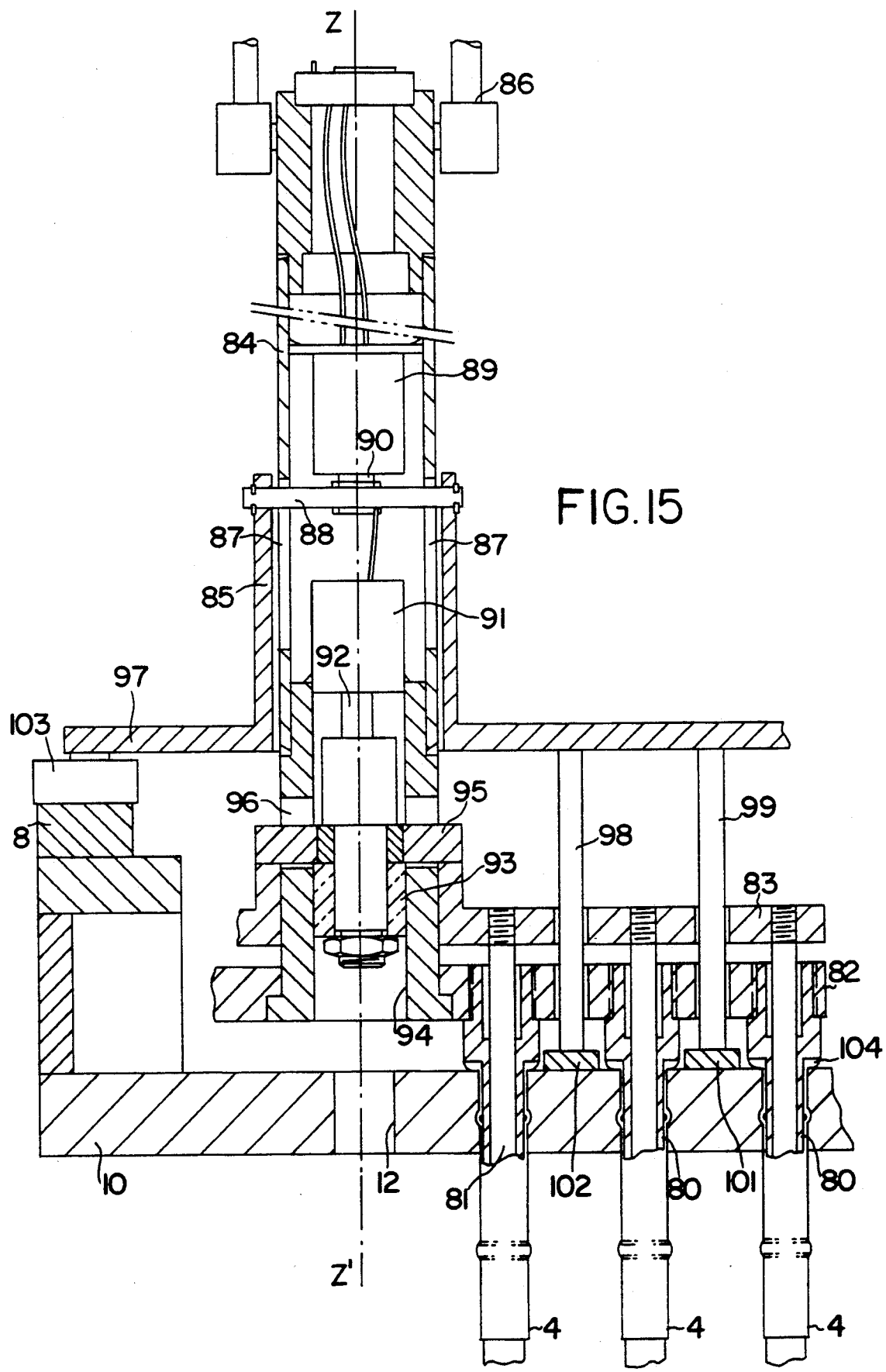
FIG. 15 is a sectional elevation view of a third embodiment of an extraction device according to the invention, allowing the simultaneous extraction of a plurality of blocking sleeves.
Figure 16:
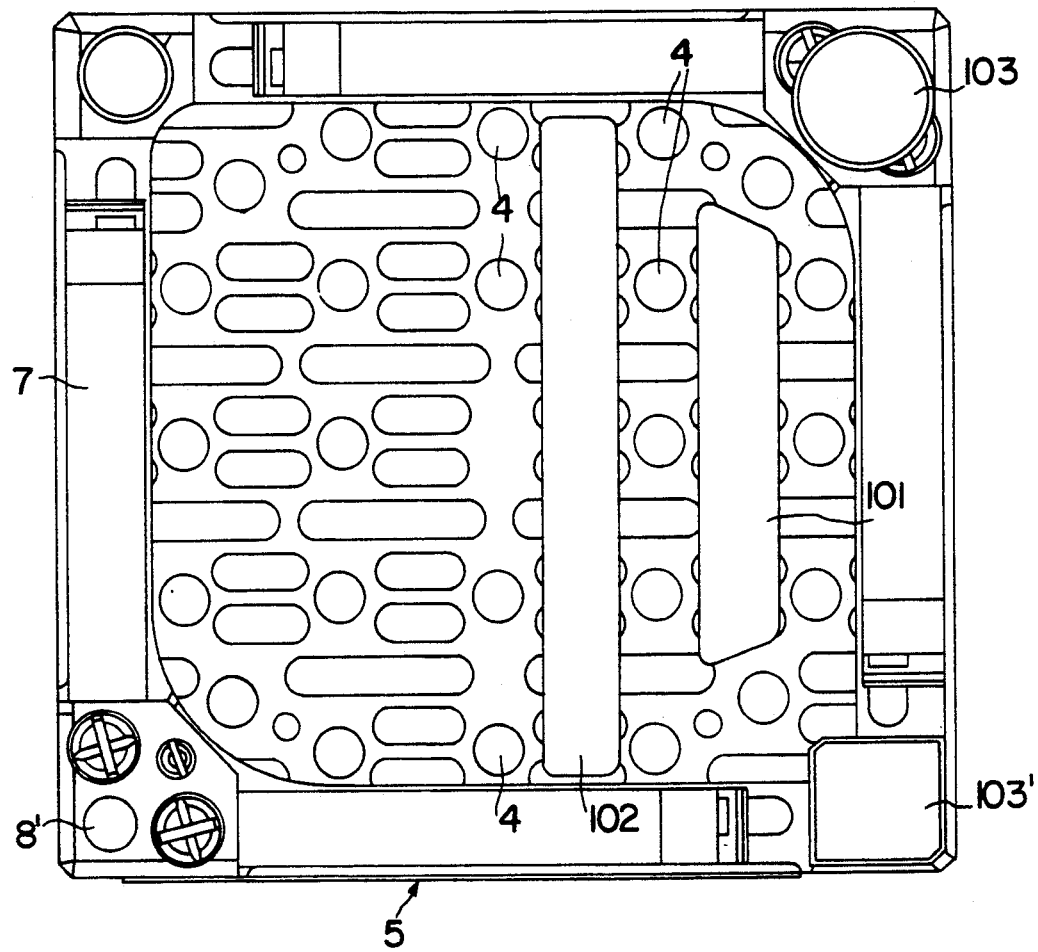
FIG. 16 is a top plan view of the upper connector of an assembly on which the extraction device shown in FIG. 15 is put to use.

FIGS. 15 and 16 show a third embodiment of an extraction device according to the invention, allowing the simultaneous extraction of a plurality of blocking sleeves from a plurality of guide tubes 4 of a fuel assembly. Such a device can serve for carrying out the simultaneous extraction of all the blocking sleeves from the guide tubes of a fuel assembly.

The extraction device, called a "multi-spindle" device, comprises a plurality of spindles 80 which are each formed in the same way as the spindle 32 of the pole illustrated in FIG. 10. In particular, these spindles 80 have retention claws which can be put in the extraction position as a result of a downward movement of the rods 81. The upper part of each of the spindles 80 is fastened to a plate 82, while the upper part of each of the actuating rods 81 of the claws is fastened, to a counterplate 83.

The plate 82 and the counterplate 83 are engaged inside the connector of the assembly, and the arrangement of the spindles and of the rods on this plate and counterplate reproduces the arrangement of the guide tubes 4 of the assembly. An extraction tool for a fuel assembly of a conventional type will therefore comprise twenty-four spindles 80, each equipped with an actuating rod 81. The pole of the device consists of two parts 84 and 85 mounted telescopically relative to one another.

The upper part 84 of the pole is connected to a grab handle 86 making it possible to position the device above a fuel assembly in the pool of the reactor. This part 84 has two apertures 87, in which is engaged an axle 88 fixed to the part 85 of the pole.

A jack 89 fastened to the part 84 has a rod connected to the axle 88 by means of a fork 90. The lower part 85 of the pole likewise carries a second jack 91, the rod 92 of which is connected to the counterplate 83 and to a guide bush 93 mounted slideably in a smooth vertical bore 94 arranged in the lower part of the part 84 of the pole. The counterplate 83 is connected to the axle of the jack 92 by means of an arm 95 engaged in apertures 96 in the lower part of the pole 84.

During the positioning of the tool on the connector of a fuel assembly, the axis ZZ' of the pole is brought into alignment with the axis of the passage hole 12 of the instrumentation tube of the fuel assembly located in its central part.

The second part 85 of the pole mounted telescopically on the first part 84 is a multiple-bearing device coming to rest on the upper connector 5 of the assembly in multiple positions. The part 85 of the pole comprises a bearing plate 97, to which are fixed rods 98, 99, whose lower part is fixed to bearing blocks 101 and 102 resting on the adaptor plate 10 between the rows of guide tubes 4, as can be seen in FIG. 16.

The rods 98 and 99 pass through the plate and counterplate 82 and 83 via apertures allowing the free movement of the plate and counterplate.

The plate 97 of the part 85 of the pole likewise rests, by means of adjustable studs, such as 103 and 103', on the bosses 8 of the upper connector 5 of the fuel assembly and on the flanges 8' for fastening the springs 7. The studs 103 and 103' have different shapes and can serve as locating means for orienting the extraction device.

After the spindles 80 have been put in place in the corresponding guide tubes 4, the depth adjustment of the spindles 80 being obtained by means of shims 104 coming to bear on the upper face of the adaptor plate 10, the jack 91 makes it possible to lower the rods 81 as a whole by means of the counterplate 83 into a position causing the extraction of the retention claws of each of the spindles 80.

With the retention claws being held in their extraction position, the jack 89 is fed so as to exert a push on the axle 88. By the reaction of the piece 85 bearing on the upper connector, the part 84 of the pole moves in the vertical direction, thereby driving the plate 82 and the spindles 80 which ensure that the blocking sleeves as a whole are extracted from the guide tubes of the assembly. Simultaneously, the counterplate 83 and the actuating rods 81 are moved in identical ways by means of the arm 95 driven by the part 84 of the pole.

Since the bearing on the upper connector 85 of the assembly providing the reaction making it possible to move the part 84 of the pole vertically is distributed over various zones of the adaptor plate and over various parts of the frame of the upper connector, no deformation of this connector occurs during the extraction.

Consequently, a simultaneous extraction of all the blocking sleeves and therefore a complete removal of the connector are carried out within a very short time and without causing any deformation of the connector.

The device according to the invention thus makes it possible to carry out quickly and reliably the extraction of the blocking sleeves from the guide tubes of the fuel assembly.

Means other than jacks may be used to actuate the rods for extracting the claws.

A different number of claws may be used on each of the extraction devices.

Likewise, other means allowing the vertical movement of the pole in order to carry out the extraction can be used.

The device for ejecting the sleeves can have a form different from that described.

Where a multi-spindle device is concerned, this ejection device is not necessary, inasmuch as all the sleeves of an assembly are extracted in a single operation.

Finally, the device according to the invention is used in all circumstances where guide tubes are fastened removably in connectors of fuel assemblies by means of blocking sleeves.

We claim:

1. Device for extracting a blocking sleeve from a guide tube in a removable connector of a fuel assembly of a nuclear reactor, said fuel assembly consisting of a bundle of parallel fuel rods held in a framework formed by guide tubes, spacers and upper and lower end connectors, being placed under water in a pool, said guide tubes in vertical position being connected removably to said upper end connector by means of a radially deformable end part of a said guide tube which is seated in a hole passing through said upper connector and which has a radially projecting retention part and receives a blocking sleeve in an inner part, in order to ensure radial expansion and retention of said guide tube by means of its retention part in an annular widening of said hole of said upper connector, said device comprising (a) a pole fastened in vertical position to a handling and lifting means arranged above said pool and having at least one lower end part comprising a spindle, said spindle having a diameter which is smaller than an inside dimater of said blocking sleeve and being pierced by an axially directed central bore and by at least two radial orifices communicating with said central bore and opening onto an outer surface of said spindle, a rod mounted slidably in said bore and having an upper part connected to a means of axial movement carried by said pole and having a part of diameter reduced relative to its running part, and at least two retention claws, each mounted in a radial orifice radially movable between a retracted position in which an outer end of the claw in radial direction is contained within an inner perimeter of said blocking sleeve, and an extracted position in which said claw projects relative to said inner perimeter of said blocking sleeve, by means of said rod moving in such a way as to bring either its running part or its part of reduced diamter into alignment with said claws, and by an elastic return means, said pole further comprising two parts mounted telescopically relative to one another in vertical direction;

(b) a shim for adjusting the spacing between said pole and said upper connector, in order to adjust the axial position of said spindle relative to said guide tube in which extraction is being carried out; and (c) means for vertical movement of a first part of said pole relative to a second part consisting of a jack having a body fixed to one of said parts of said pole bearing on said upper connector and a rod fixed to said other part of said pole.

2. Extraction device according to claim 1, comprising, around a lower end of said pole, a unit for ejection of blocking sleeves, said unit comprising a pusher sliding axially and fixed to an ejector plate mounted slideably around said lower end of said pole by means of stems and returned upwards by elastic means inserted between a part of said pole and said pusher.

3. Extraction device according to claim 1, wherein said lower part of said pole has an asymmetric form allowing said lower part to be introduded into guide tubes located in the vicinity of walls of said upper connector.

4. Extraction device according to claim 1, wherein said lower part of said pole carries, by means of a plate, a set of extraction spindles each having at least two radially movable retention claws and a rod for actuating said axially movable claws, said spindles and said actuating rods being fastened to plates in positions corresponding to positions of said guide tubes of a fuel assembly.

5. Extraction device according to claim 4, wherein said pole consists of two telescoping parts, one of these parts carrying a first jack having a rod connected to the plate to which are fastened said actuating rods of said retention claws, and a second jack having a rod connected to said second part of said pole having devices for bearing on said upper connector, said support plate of said spindles being fixed to said first part of said pole.

6. Extraction device according to claim 5, wherein said devices for the bearing of said second part of said pole on said upper connector consist of blocks bearing on a fastening plate of said guide tubes and of adjustable shims bearing on parts of a frame of said upper connector.

7. Extraction device according to claim 1, comprising, in the vicinity of the connector which is being removed, a bin for recovering said blocking sleeves after they have been extracted.

8. Extraction device according to claim 7, wherein said recovery bin comprises an upper wall having a cutout forming a cavity intended for receiving said lower end of said pole.

* * * * *